Feb. 23, 1965 O. MOKLEBUST 3,170,786
ROTARY KILN PROCESSING OF CHEMICALLY REACTIVE MATERIALS
Filed Feb. 2, 1962 11 Sheets-Sheet 1

INVENTOR.
OLAV MOKLEBUST
BY
Ward, Neal, Haselton, Orme & McElhannon
ATTORNEYS.

INVENTOR.
OLAV MOKLEBUST
BY
ATTORNEYS.

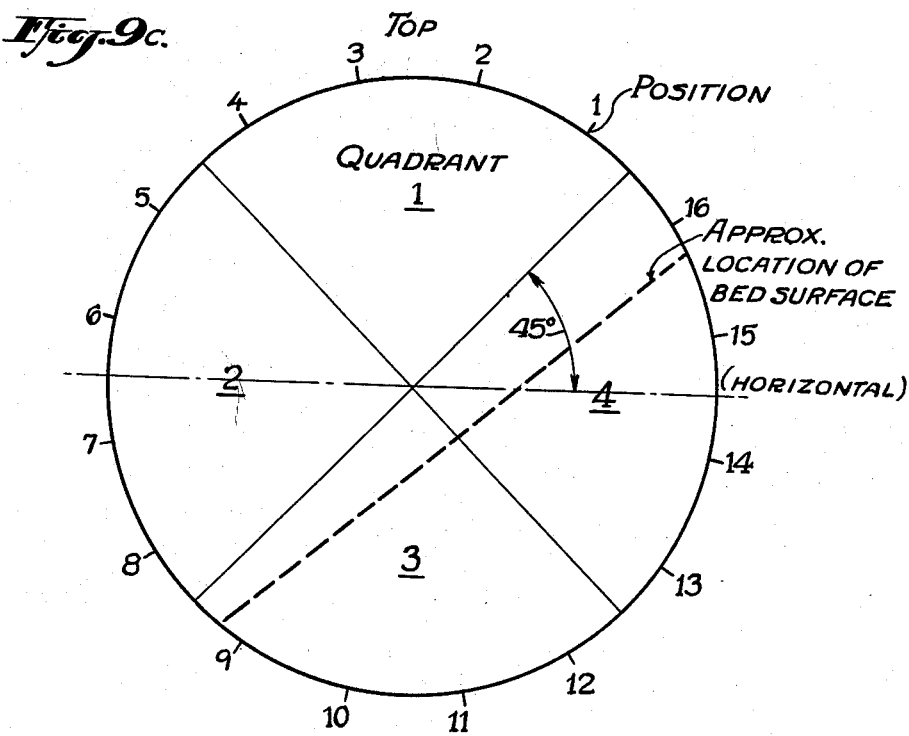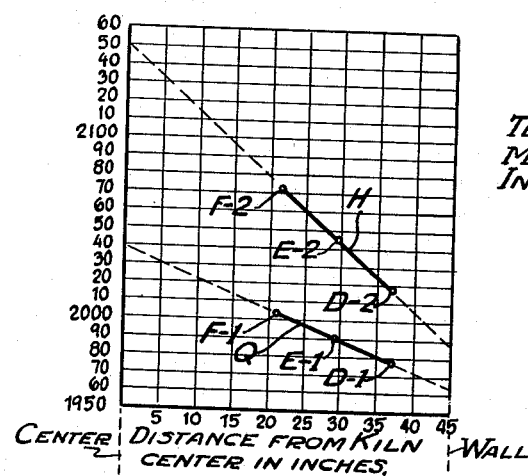

Pilot Kiln

Temperature Measurements by Different Length T.C's Mounted at T.C. No. 4, during rotation

| T.C. | Distance from Wall | Temperature Readings °F | |
|---|---|---|---|
| | | HIGH | LOW |
| D. | 8" | $D_2$–2020 | D.–1980 |
| E. | 16" | $E_2$–2045 | E.–1990 |
| F. | 24" | $F_2$–2075 | F.–2005 |

INVENTOR.
OLAV MOKLEBUST

United States Patent Office 3,170,786
Patented Feb. 23, 1965

3,170,786
ROTARY KILN PROCESSING OF CHEMICALLY
REACTIVE MATERIALS
Olav Moklebust, Stamford, Conn., assignor to R-N Corporation, New York, N.Y., a corporation of Delaware
Filed Feb. 2, 1962, Ser. No. 170,698
7 Claims. (Cl. 75—34)

This invention pertains in its broader aspects to improvements in methods operating on the rotary kiln principle, of general application to the treatment of loose aggregates of chemically reactive materials, such as the roasting or reduction of ores, calcining of pigments, the burning of limestone and cement, etc., for providing more efficient operation at higher feed rates than heretofore.

The invention pertains more particularly to improvements in rotary kiln, low temperature reductions, without fusion or sintering, of oxide ores, especially oxidic iron ores, in the presence of a solid carbonaceous reductant, and in an atmosphere of hot combustible gases, into which may be introduced, in some instances, controlled amounts of oxygen or oxygen-containing gases.

One type of rotary kiln in current use in industry today for the roasting, agglomeration or reduction of ores, production of cement, calcining of pigments, etc., is of the so-called end-burner type, in which the sole source of heat for carrying out the treatment or reaction, is supplied from a burner disposed at one end of the kiln.

A wealth of confusing literature regarding scale-up of such ordinary, end-burner rotary kilns from pilot to commercial production sizes has been published. Common to most of the scale-up formulae presented, is that, although they are based on sound, physical heat transfer laws, their bases contain so many assumptions as regards values of physical data entering into these formulae that agreement with actual practice is more or less coincidental. Besides, several important physical factors, as for instance, kiln rotation, kiln slope, etc., are usually not included in the formulae; nor has any appreciable significance been attributed to these factors in commercial operations.

For instance, when applying these scale-up formulae, which usually contain only the kiln diameters and kiln lengths as factors, it is generally not questioned whether the base kiln was operated under optimum conditions as regards kiln speed, slope and fuel economy—or capacity economy.

As the purpose of any scale-up formulae must be to arrive at the optimum production of the larger scale kiln, it is evident that the base kiln must be operated under optimum conditions before applying a simple diameter-length formula to produce a larger kiln—or the scale-up formulae must include all variable factors.

Moreover, such information as has been published relative to design and operation of such end-burner kilns, is of little value or significance as regards the processing of certain materials according to the present invention, which are best carried out in rotary kilns of the type described in my Patent 2,829,042, and characterized by the provision of gas inlet tubes penetrating the kiln wall at spaced intervals, for the introduction of combustible gases or oxygen or oxygen-containing gases or mixtures thereof in controlled amounts, such as to establish and maintain desired kiln temperature and furnace atmosphere conditions throughout the length of the kiln in the manner described in said patent.

In the construction and operation of rotary kilns for purposes aforesaid and as heretofore practiced, the kiln slope has generally been selected primarily to provide the requisite feed rate based on the conventional formula that the greater the slope the higher the feed rate. Also the conventional practice has been to employ a relatively slow speed of kiln rotation, usually on the order of about 3–10 minutes per revolution primarily for the purpose of tumbling the bed of loose aggregate material sufficiently to provide repeated exposure of all particles to the hot furnace gases in passing through the reaction zone of the kiln.

Now I have discovered in accordance with a basic concept of my invention as derived from test resutls presented below, that in reacting loose aggregates of reactive materials in a rotary kiln, the time required for completing the reaction within the kiln reaction zone, decreases progressively as the rotary speed of the kiln is increased. It follows from this that the kiln capacity is correspondingly increased with increasing kiln speed, since the feed rate of the material through the kiln may be increased with increasing kiln speed in the same proportion that the reaction time of the material is reduced, and without otherwise changing the operating conditions of the kiln.

I further find, however, that if the feed rate is increased in this proportion, it is in general insufficient to maintain the volume of the material in the kiln at a constant fraction or percentage of the kiln volume, referred to herein as the "kiln load." As against this, it is highly desirable that the kiln load be held substantially constant and preferably such as to load the kiln substantially to the maximum permissible capacity at all times, in order to operate the kiln most efficiently as explained below. Since the rate at which the material is moved through the kiln is proportional to the product of the kiln slope and the rotary kiln speed, if the speed is increased while holding the slope constant, the feed rate for maintaining a constant load in the kiln, must be increased in a direct 1:1 ratio basis to the kiln speed. But as above indicated, increasing the feed rate in this ratio to the kiln speed, more than offsets the accompanying reduction in the time required to complete reaction of the material in passing through the kiln. Hence if the material feed rate, kiln slope and kiln operation are adjusted for complete or optimum reaction of the material at some initial kiln speed, then if the speed is increased and the feed rate proportionately increased to maintain the kiln load constant, but without otherwise altering the kiln or its operation, the feed rate will be too great and the reaction will be incomplete at the higher speed.

Now since as above stated, the rate at which the material is moved through the kiln is proportional to the product of both the kiln speed and the kiln slope, the slope may be compensatively reduced as the kiln speed is increased in just the precise amount for causing the material to be moved through the kiln at the correct speed required for complete or optimum reaction of the material as it passes through the kiln, while at the same time maintaining the kiln load constant at the desired percentage of the kiln volume.

If an exclusively end-burner type of kiln is employed for processing the material, this compensating feed rate adjustment must be made in this manner, since the reaction zone of such a kiln, i.e., the zone of the kiln within which the reaction occurs, is of relatively fixed and invariable length. This is due to the fact that the sole source of heat for heating the kiln to the reaction temperature of the material is supplied from the burner at the kiln discharge end, from whence the temperature falls off progressively and uncontrollably to the kiln feed end. Hence the reaction of the material occurs in only a relatively short zone adjacent the kiln discharge end, since it is only here that the temperature can be maintained sufficiently high by the burner to react the material.

On the other hand, if a kiln of the type described in my said patent is employed for reacting the material, the compensating adjustment above referred to, within certain limits, may be made by increasing the length of the reaction zone as the kiln speed is increased, rather than by decreasing the kiln slope. In this type of kiln, the reaction zone can, as described in said patent and below herein, be extended to any desired distance from the kiln discharge end—within limits, of course, as set by the over-all length of the kiln—by controlled introduction of suitable gases through the gas inlet tubes spaced along the kiln, either oxidizing gases or otherwise, depending on the material processed. Hence, if the kiln as preset at a fixed slope, is adjusted as to feed rate and length of reaction zone for optimum or complete reaction of the material processed at an initially low kiln speed, and the kiln speed is then increased while proportionally increasing the feed rate on a 1:1 ratio basis—a rate which as above noted is too great for the reaction to be completed in the absence of compensating changes as above noted—this compensation can now be made by simply extending the reaction zone to the length required for completing the reaction at the new feed rate. Lengthening the reaction zone in this way assures that each fraction of the material processed through the kiln will remain in the reaction zone for just a sufficient interval to complete the reaction, taking into account both the reduced reaction time as well as the high feed rate at the new kiln speed.

As above stated, there is of course a limit beyond which the kiln cannot be adjusted in this way for optimum operation as the kiln speed is increased. This limit is reached when the kiln speed has been increased to the magnitude at which the reduction zone extends substantially the entire length of the kiln, except for such relatively short distance at the feed end as may be required as a preheating zone as discussed below. When this limit is reached, however, the capacity of the kiln may be still further increased by holding the length of the reaction zone constant at its maximum permissible value, while further increasing the kiln speed, proportionally increasing the feed rate and reducing the kiln slope until optimum reaction conditions are obtained at any selected higher feed rate.

Now I have further discovered in accordance with another aspect of the invention, that for any given kiln speed, the reaction time for the material processed also decreases progressively with progressive increase in the kiln loading, i.e., the fraction of the kiln volume occupied by the moving bed of the material therein. Hence the higher the kiln loading within permissible limits, the higher the kiln capacity at any given speed, this constituting a further capacity increase in addition to that obtained by increasing the kiln speed, so that the maximum capacity for any given kiln is obtained by loading the same to the maximum permissible extent and rotating the same at the maximum permissible speed. The upper practical limit for kiln loading is about 45% of the kiln volume, particularly for kilns of the gas inlet tube type, the tubes of which penetrate to the kiln axis. Higher degrees of loading would tend to block these tubes. Substantial advantages in operation in this respect may be obtained at kiln loadings down to about 15% of the kiln volume, a preferred loading being about 25–45%.

From the foregoing explanation, it will now be seen that the invention provides novel methods of processing loose aggregates of reactive materials in rotary kilns in such manner as greatly to increase the capacity of a kiln of any given dimensions, and also in such manner as to increase the efficiency and speed of material processing by increasing the rate at which the material is reacted.

Basically the invention thus consists in a method of processing loose aggregates of reactive materials in a rotary kiln according to which the kiln is rotated at substantially the maximum speed which is practical, consistent with the physical limitations of the equipment, thereby to reduce to the minimum obtainable, the time required for reacting the material to completion, establishing a reaction zone in the kiln for reacting the material therein, and feeding the material through the kiln at such rate that each portion thereof is retained in the reaction zone for substantially said minimum time.

In one of its modifications, the invention further embraces the above basic process, according to which the feed rate is also adjusted to maintain a preselected and preferably a high or substantially maximum kiln load of the material processed, and the kiln slope or length of the reaction zone or both correspondingly so adjusted or preset as to maintain the kiln load substantially constant at the selected value.

In accordance with another of its modifications, the invention embraces the method of processing materials as aforesaid in a rotary kiln of the spaced gas inlet tube type, according to which the feed rate of the material is varied proportionately with changes in the kiln speed to maintain the kiln load substantially constant, and wherein at any selected speed of kiln rotation or feed rate, the kiln slope or length of the reaction zone or both are adjusted to retain each portion of the material processed in the reaction zone for substantially the minimum time required to react the material.

For reasons above discussed, the invention may most advantageously be practiced in kilns operated at extremely high kiln speeds, a practical and effective range for which is on the order of about 0.1–2 and preferably about 0.1–1 minutes per revolution (m.p.r.), in conjunction with which the kiln slope required is ordinarily on the order of 2% or under. Where in existing kilns such speeds cannot be obtained, the advantages of the invention may nevertheless be obtained by operating such kilns at about 75–100% of their maximum attainable speeds.

The above and other novel aspects of the invention will now be explained more in detail, with reference to the suporting test data and to the accompanying drawings wherein:

FIGURE 1 is a more or less schematic showing in longitudinal sectional elevation of a preferred form of rotary kiln construction of the spaced inlet tube type, for carrying out the novel methods in accordance with the invention for treating loose aggregates of reactive materials.

FIGURES 2–6, inc., are kiln temperature and metallization profiles obtained for low temperature reductions of iron ore in a rotary kiln of the type shown in FIG. 1, at various feed rates and with the kiln reduction zone adjusted for optimum metallization at each feed rate. As shown in the drawings, the ore feed rates were 3.5 t.p.h. (tons per hour), 4.5 t.p.h., 5.5 t.p.h., 6.5 t.p.h. and 7 t.p.h., for FIGS. 2–6, respectively.

Figure 9A:
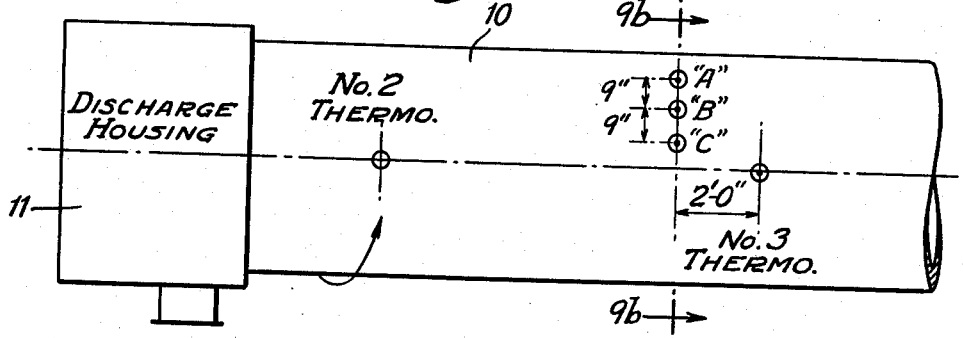
Figure 9B:
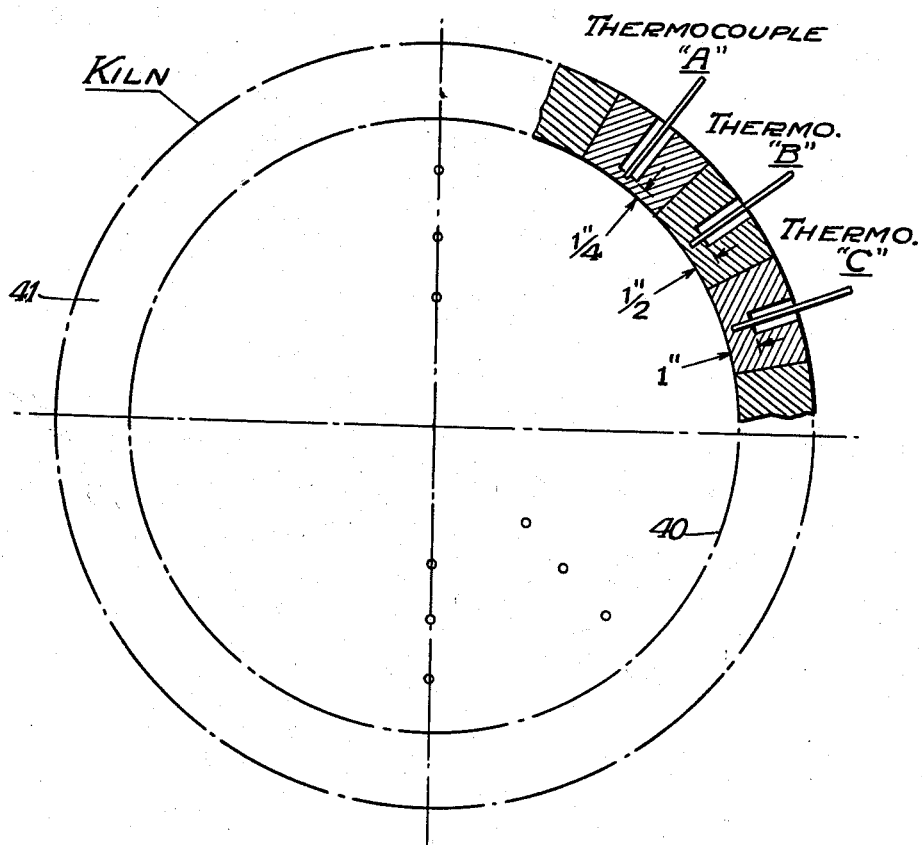

FIGURES 9a and 9b are diagrammatic showings of the location of thermocouples in the lining of the rotary kiln of FIG. 1, for measuring the kiln wall temperatures during certain of the ore reduction runs of FIGS. 2–6 as discussed below, FIG. 9a being a view in side elevation of a portion of the kiln at the discharge end and FIG. 9b a sectional elevation at 9b—9b of FIG. 9a. FIGURE 9c is a schematic view of the kiln section of FIG. 9b, but indicating the successive angular positions of the thermocouples at which readings were taken thereon during kiln rotation.

Figure 10:
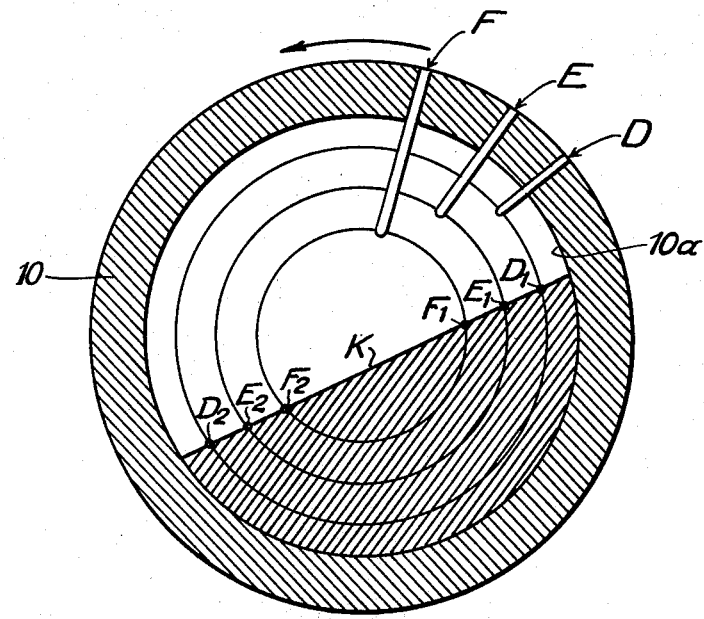

FIGURE 10 is a transverse sectional elevation of the kiln corresponding substantially to FIG. 9c, but showing the positioning of additional thermocouples mounted in the kiln wall but extending successively increasing radial distances into the kiln interior, for measuring the temperatures thereat also during certain of the ore reduction runs aforesaid.

FIGURE 11 is a graphical plot of the kiln temperatures as measured on the thermocouples of FIG. 10 during an ore reduction operation as explained.

Figure 1:
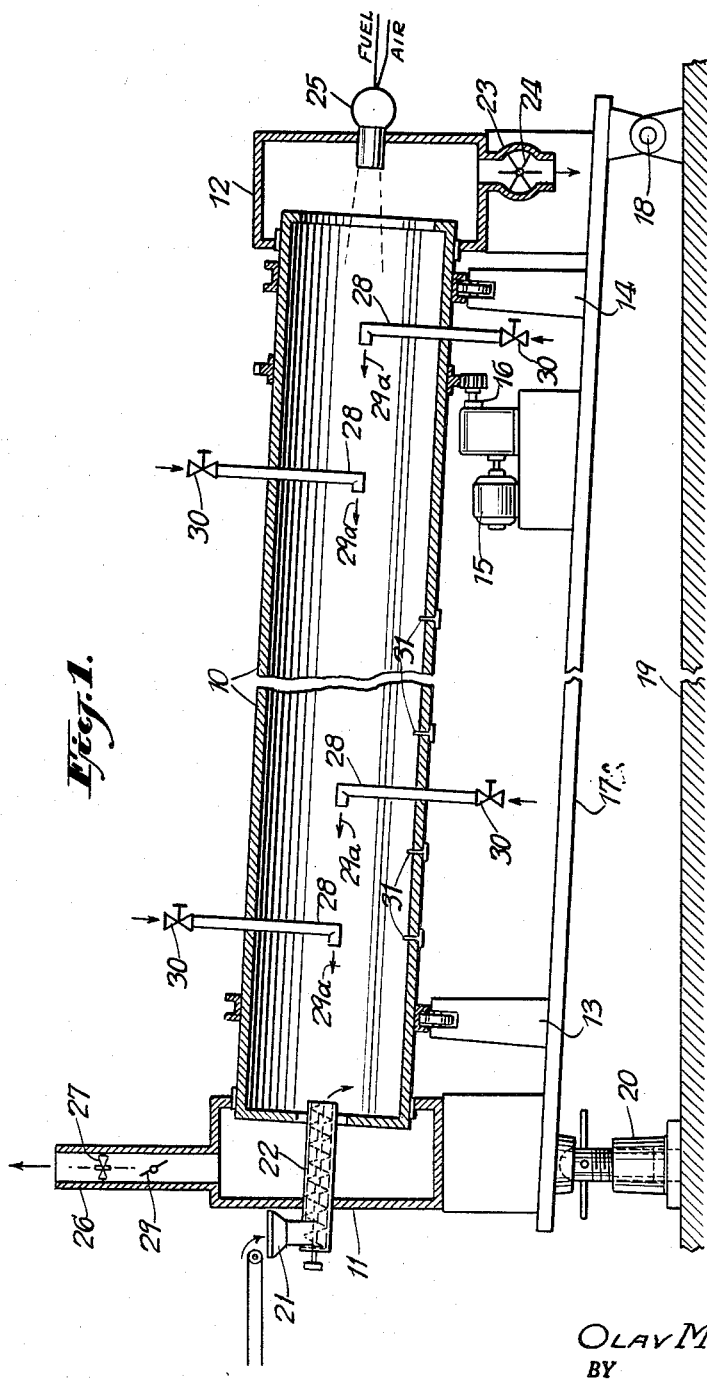

Referring to FIG. 1, the apparatus shown comprises a rotary kiln 10, which extends between stationary feed end and delivery end housings 11, 12, respectively. The kiln is rotatably supported on roller bearings 13, 14, and is motor driven, as at 15, through suitable gearing, as at 16. The apparatus above described is mounted on a supporting beam 17, which is pivotally supported at one end, as at 18, on a foundation 19, and is supported at its opposite end on a jack 20, carried by the foundation, for adjustably varying the kiln slope.

The kiln slopes downwardly from feed to discharge ends as shown. The loose aggregate material to be treated is fed into a hopper 21, and thence into the kiln through a screw feeder 22, and travels thence along the kiln during the reaction treatment, being discharged from the delivery end into housing 12, and thence to the exterior through the discharge outlet 23, having mounted therein a rotating star valve 24, to prevent substantial escape of gases.

Mounted in the delivery end housing 12, is a burner and precombustion chamber 25, supplied with a mixture of fuel, such as natural gas, and a limited amount of air, which burns the fuel to incomplete combustion, the resulting hot combustible gases passing thence into and through the kiln to the stack 26 surmounting the feed end housing 11. The stack contains a fan 27 and damper 29 for regulating the draft.

The wall of the kiln 10, is penetrated by a series of gas inlet tubes, as at 28, spaced therealong and thereabout, these tubes extending radially into the kiln, substantially to the kiln axis and opening thereat, as at 29a, in the direction of the gas flow. On the exterior ends of these tubes are mounted inlet control valves, as at 30, for adjusting the inflow of air or other oxygen-containing gas and thereby regulating the gas temperature profile throughout the kiln length in the manner hereinafter described. The kiln also mounts at spaced intervals, a series of thermocouples, as at 31, for determining the bed and gas temperatures along and within the kiln during ore reduction or other reaction processing.

As above stated, a series of ore reduction runs were made with a pilot kiln constructed substantially in accordance with FIG. 1. The rotary kiln employed in these tests had an outside diameter of 9 feet, an inside diameter of 7.5 feet, a length of 150 feet. During these tests the kiln slope was set at 3%. Test runs of approximately 2–3 weeks each were made with ore-coke inputs containing 3.5, 4.5, 5.5 and 6.5 t.p.h., respectively, with correspondingly incremental adjustments of the speed of kiln rotation at each feed rate to maintain the bed level constant at about 35%. The iron ore employed was Alabama Big Seam having an iron content of about 34–40%, crushed to ⅝", screened and reblended to contain 30% (−6 mesh) fines. The ore/coke ratio of 1:058 and the degree of metalliaztion, approximately 95%, were kept constant for all tests. During the runs, determinations were made of the average bed and gas temperatures at points spaced along the kiln by means of the thermocouples 31, FIG. 1, with results as plotted in FIGS. 2–5, inc., respectively. In addition, for the runs at 3.5, 4.5 and 6.5 t.p.h., samples withdrawn from the bed at points spaced along the kiln, during the reductions, were analyzed for the percents of total iron, iron oxide (FeO), metal and metallization, with results as plotted and graphed in FIGS. 2, 3 and 5, respectively. The gas temperature profile was also determined for a 7 t.p.h. feed rate with results as plotted in FIG. 6, in the same manner as in FIGS. 2–5, inc.

Referring to FIGS. 2–6, inc., the gas temperature profile was adjusted in each instance, by means of the burner 25 and air tubes 28, FIG. 1, to metallize the ore to the extent of about 95% at the discharge end of the kiln. It will be seen from the percent metallization graphs of FIGS. 2, 3 and 5, that metallization starts in each instance at the distance from the feed end of the kiln at which the gas temperature increases to approximately 1800° F., the metallization increasing progressively thereafter along the kiln to the discharge end, to a final value of approximately 95% with accompanying rise in the gas temperature to just under 2000° F. The kiln length within which metallization is thus effected is the reaction or reduction zone. It will be seen that within the reduction zone, the percent metallization increases in approximately linear relation to the distance along the kiln from the commencement of this zone.

Figure 2:
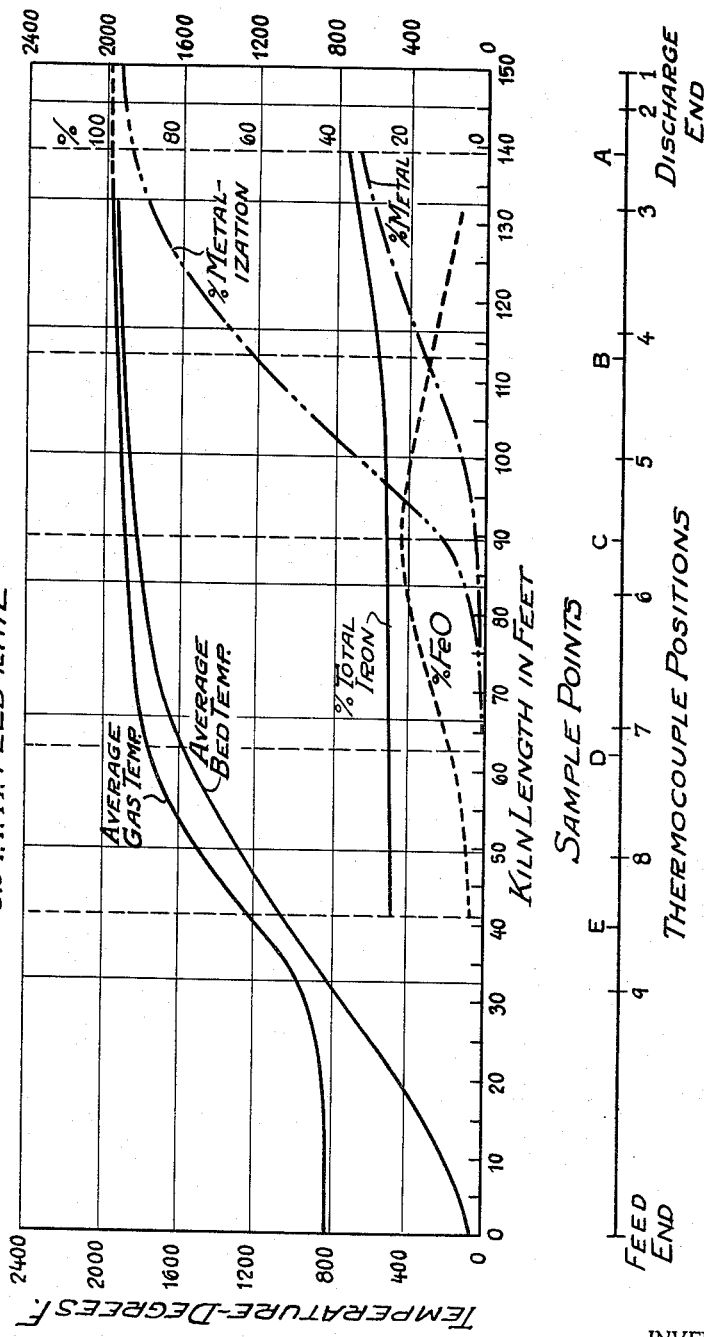
Figure 3:
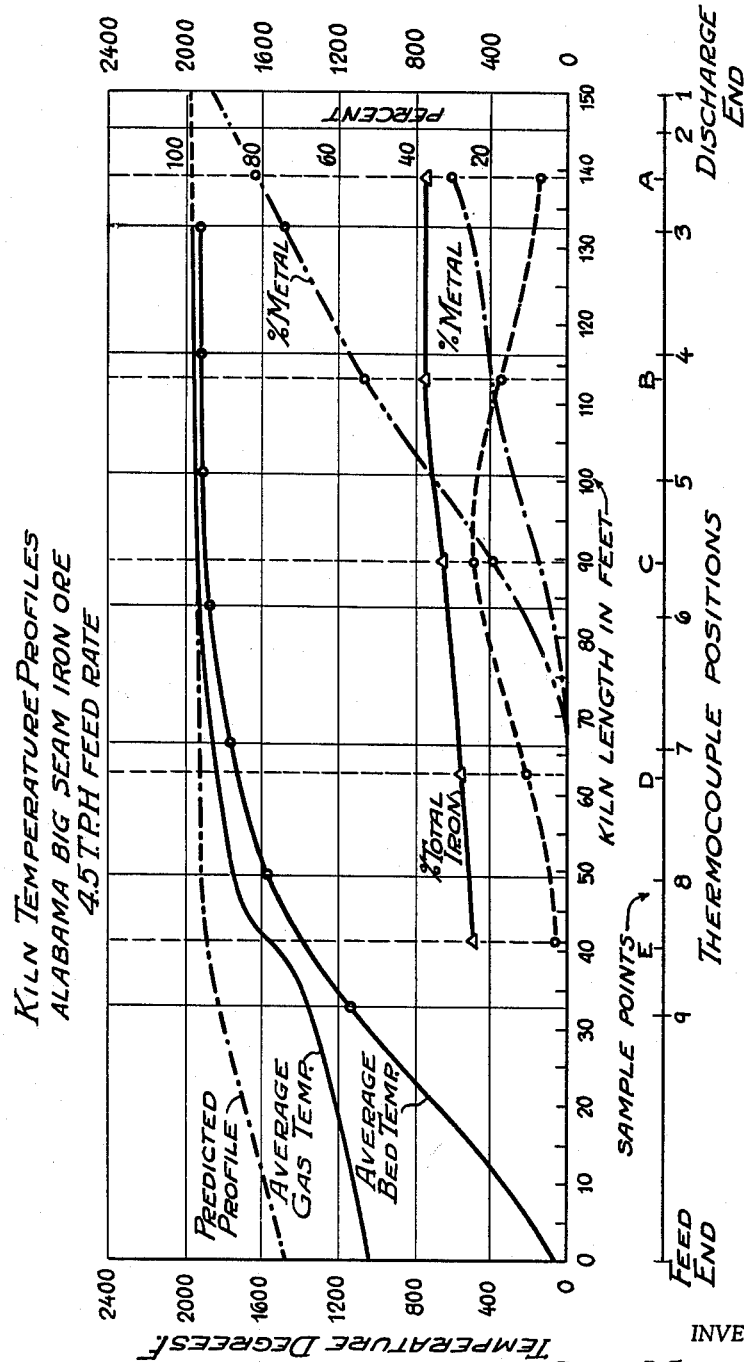

Referring to FIG. 2, the optimum conditions for the initial feed rate of 3.5 t.p.h. were established as follows: After heating up the kiln by means of a gas flame supplied by the burner 25, FIG. 1, the feed rate of 3.5 t.p.h. was started and the kiln speed adjusted to give a kiln load of about 35% of the kiln volume. The rotational kiln speed thus arrived at was 5.5 m.p.r. The temperature at the discharge end of the reduction zone was then raised gradually to the maximum, safe temperature, without creating sintering. The temperature in the reduction zone was subsequently raised gradually and progressively towards the feed end by the controlled introduction of air through the inlet tubes 28, FIG. 1, until a steady, high metallization was obtained on a continuous basis. These conditions were then the optimum conditions for the kiln at the fixed slope (3%) and for this feed rate (3.5 t.p.h.). The gas and bed temperature profiles thus obtained for the 3.5 ton rate are shown by the so designated graphs of FIG. 2.

For the next feed rate of 4.5 t.p.h., the kiln speed was increased in the ratio of the feed rates 4.5:3.5 t.p.h. from 5.5 to 4.5 minutes per revolution (m.p.r.), thus maintaining the same kiln load of 35%. The retention time of the material in the kiln was thereby reduced correspondingly and the metallization dropped accordingly. More fuel was added to the burner 25, FIG. 1, and while maintaining the same temperature in the reduction zone, the latter was extended by raising the temperature towards the feed end gradually and progressively by air introduced through tubes 28, FIG. 1, until a steady, high metallization was again obtained on a continuous basis. These were then the optimum conditions for the 4.5 ton rate. The temperature profiles thus obtained for the 4.5 ton rate are shown by the so designated graphs of FIG. 3.

Figure 4:
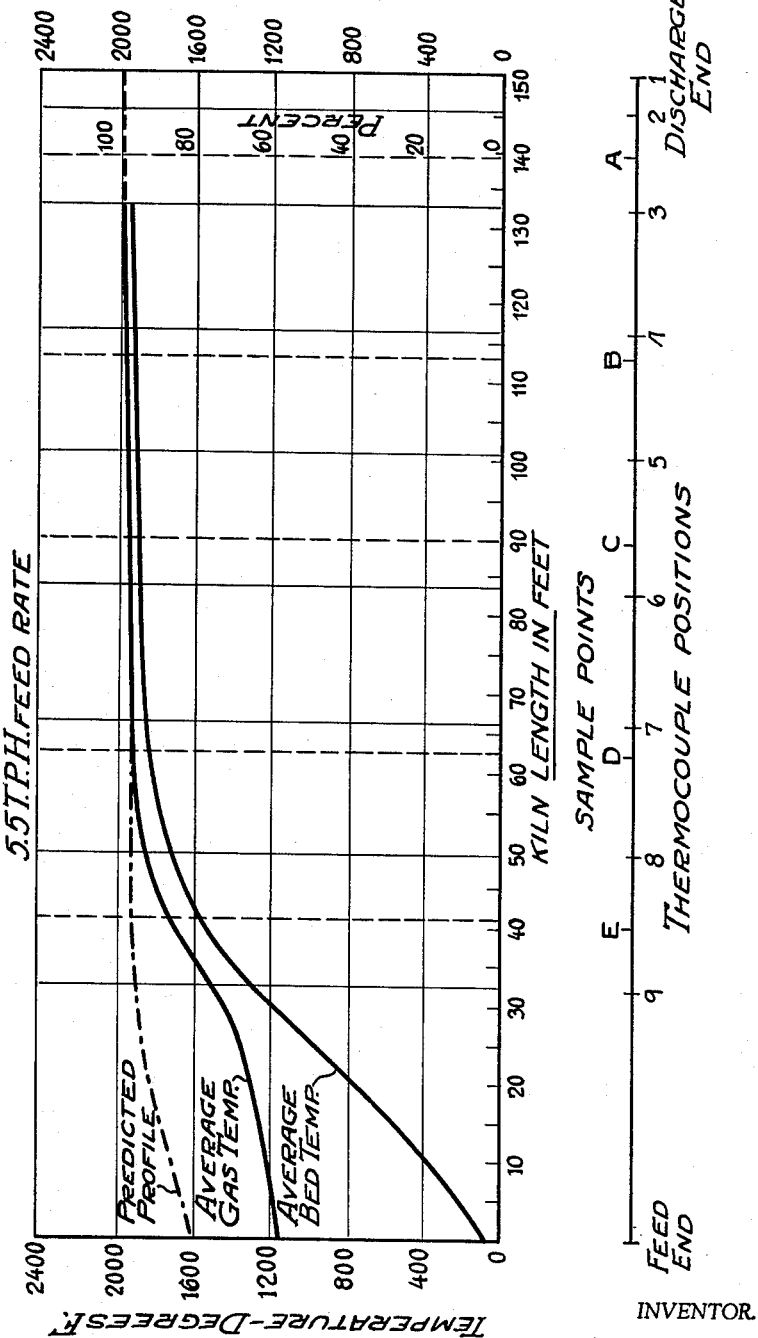
Figure 5:
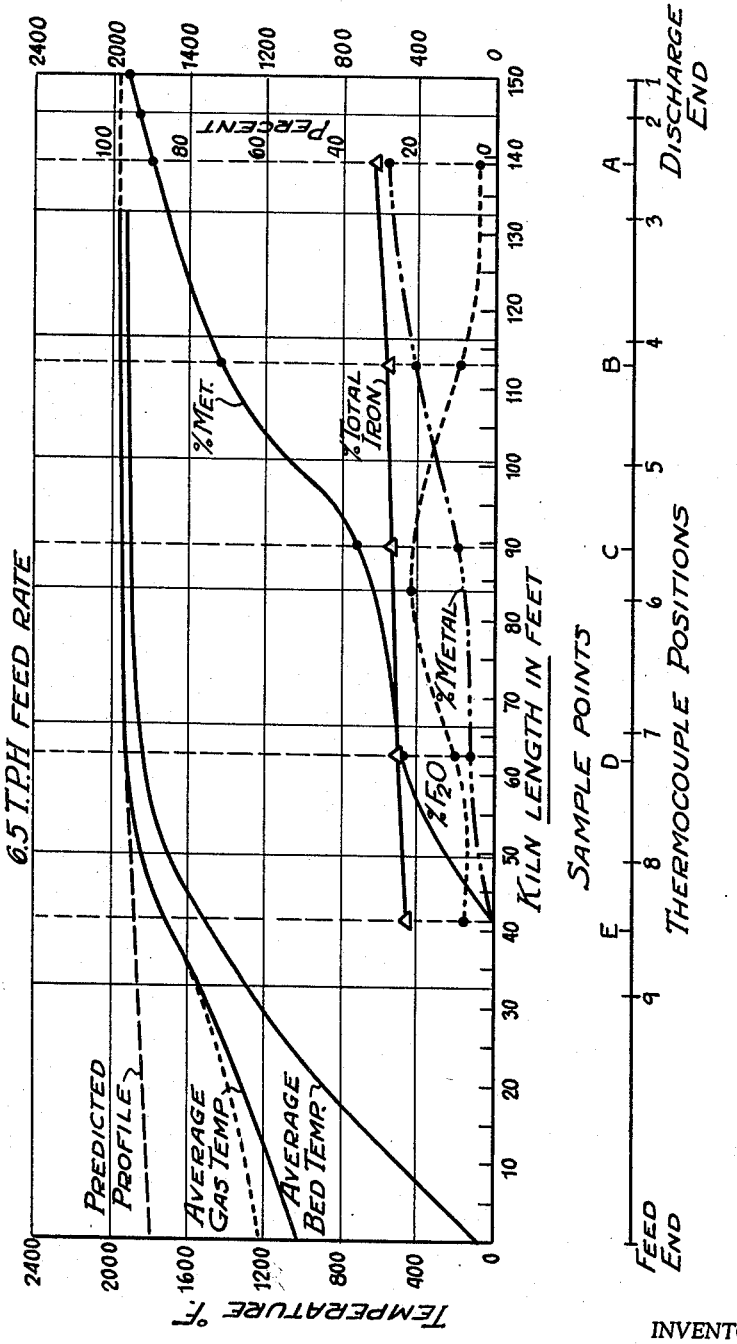

The same procedure of increasing kiln speed and extending the reduction zone was applied for the kiln feed rates of 5.5 and 6.5 t.p.h., the kiln speeds being, respectively, 3.6 and 3.25 m.p.r., and resulting in the temperature profiles shown in FIGS. 4 and 5, respectively. The only operational difference was that in establishing the profiles for the 6.5 ton rate, water had to be injected into the feed end housing in order to cool the gases for protection of the exhaust fan. The true temperature profile in the preheating zone was therefore adjusted to the dotted line for the average gas temperature shown at the left in FIG. 5.

In running these tests it was noted that increasing the capacity by extending the reduction zone, did not increase the danger of sintering of the material in the reduction zone. In fact, indications were that the danger of sintering decreased with higher kiln speeds. The four rates were run for a sufficient length of time (2–3 weeks each), to establish that no sintering occurred in the reduction zone.

In attempting to evaluate the test results, it was found most illuminating at first to study the reaction or reduction zone by itself. The reduction zone for these tests is defined as the last part of the kiln from the point where metallic iron starts to form to the discharge end of the kiln.

The following table shows for the different feed rates of FIGS. 2–6, inc., the corresponding kiln speeds, lengths of reduction and preheat zones, comparative times in reduction zone, exhaust gas temperatures and fuel consumption.

TABLE I

[7.5′ I.D. x 150′ kiln—3% slope]

| Feed Rate, t.p.h. | Reduction Zone, Ft. | Preheat Zone Ft. | Kiln Speed | | Compar. Times in Reduc. Zone | Exhaust Gas Temp., °F. | Gas Consump., Cu. Ft./ Ton of Ore |
|---|---|---|---|---|---|---|---|
| | | | M.p.r. | R.p.m. | | | |
| 3.5 | 75 | 75 | 5.5 | .182 | 100 | 820 | 3,753 |
| 4.5 | 85 | 65 | 4.5 | .222 | 88 | 1,020 | 3,644 |
| 5.5 | 97 | 53 | 3.6 | .278 | 82 | 1,150 | 3,541 |
| 6.5 | 110 | 40 | 3.25 | .308 | 79 | 1,220 | 3,888 |
| 7.0 | 115 | 35 | 2.75 | .364 | 76 | 1,280 | 3,900 |

Referring to the table, the values for comparative times in the reduction zone were computed from the feed rates and reduction zone lengths on the basis that the time required for each fraction of the material processed to pass through the reduction zone is directly proportional to the length of the reduction zone and inversely proportional to the feed rate. The values thus obtained for the higher feed rates divided by that at the 3.5 t.p.h. feed rate are the data on comparative times given in the table. It will be seen that this time decreases with increasing feed rate and kiln speed, thus experimentally confirming the basic premise of the invention above stated. The data also establishes that increasing the feed rate with kiln speed on a 1:1 ratio basis for maintaining the kiln load constant was too great to just offset the decrease in reaction time of the material processed, as shown by the necessity for increasing the reduction zone length with increasing kiln speed in order to adjust to optimum conditions of reduction at each speed.

Figure 7:
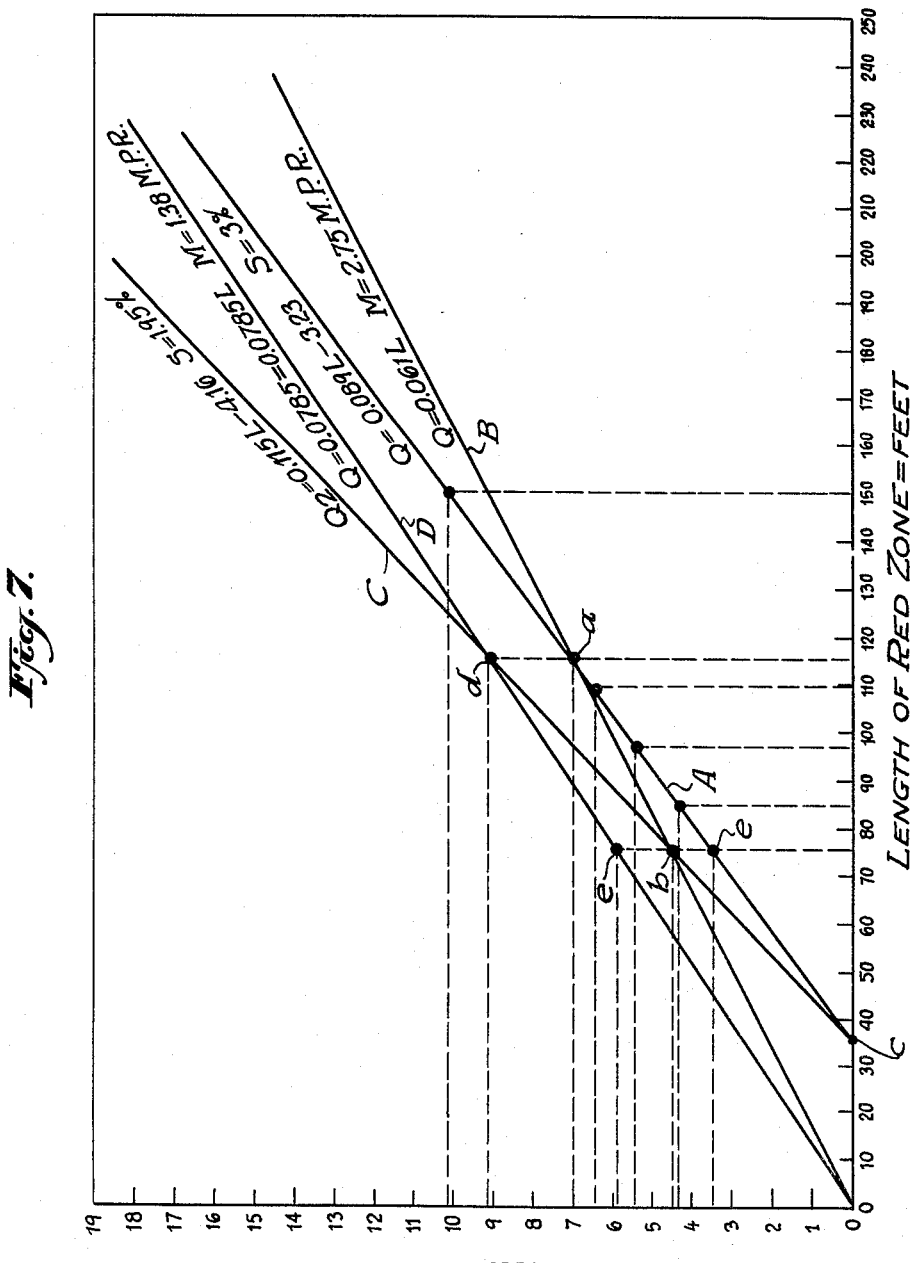
FIGURE 7 is a graphical plot of the ore feed rates plotted as ordinates against the lengths of the corresponding kiln reduction zones as abscissae, as taken from the plots of FIGS. 2–6, inc., respectively, together with additional graphs derived therefrom as hereinafter explained.

The feed rates and corresponding lengths of the reduction zones are also presented graphically by graph A of FIG. 7. As therein shown the relation between the two is substantially a straight line function within the area measured. The formula as derived from this graph is (1) $$Q = 0.089L - 3.23$$

wherein:
$Q$ = capacity in tons per hour.
$L$ = length of reduction zone in feet.

Comparing the 3.5-ton rate with the 7-ton rate, it will be seen that by extending the reduction zone from 75′ to 115′, that is $$\left(\frac{115-75}{75}\right) = 53.4\%$$

the capacity is increased 100%. This is due to better heat transfer and higher reaction rate obtained by raising the kiln temperature in the extended zone and by doubling the kiln rotation. It will be seen from Table I that when the reduction zone is extended from 75′ to 115′, the exhaust gas temperature has risen to approximately 800° F. to 1300° F.

Reverting to FIG. 7, the big increase in capacity by extending the reduction zone from 75′ to 115′, is not a fair comparison with respect to the 75′ reduction zone, because the kiln was operated at only one-half the speed, i.e., 5.5 m.p.r. for the reduction zone of 75′, as compared with 2.75 m.p.r. when 115′ was utilized as reduction zone. This raises the question as to what would happen to the capacity if 75′ were used for reduction and if the same rotational speed of 2.75 m.p.r. were used as for the 115′ reduction zone. This can be done by reducing the kiln slope in the ratio of the reduction zone lengths, i.e., (2) $$S = 3 \cdot \frac{75}{115} = 1.95$$

wherein: $S$ = slope in percent.

The kiln capacity becomes thus proportionally greater in direct proportion to the ratio of lengths of the reduction zones of 75′ and 115′ based on the 7 t.p.h. rate according to the formula:

(3) $$Q_1 = 7 \cdot \frac{75}{115} = 4.55 \text{ t.p.h.}$$

In other words, with a kiln slope of 1.95%, a rotation of 2.75 m.p.r. and using only 75′ as reduction zone, the kiln capacity becomes 4.55 t.p.h. instead of 3.5 t.p.h. at 3% kiln slope and 5.5 m.p.r. kiln speed. If 85′ were to be used as reduction zone, with a rotation of 2.75 m.p.r., the kiln slope would have to be changed to $$3 \cdot \frac{85}{115} = 2.2\%$$

and the capacity would then be $$7 \cdot \frac{85}{115} = 5.2 \text{ t.p.h.}$$

instead of 4.5 t.p.h. at a kiln slope of 3% and a rotation of 4.5 m.p.r. More generally, if the reduction zone is changed to any other length L for a kiln speed of 2.75 m.p.r., the slope would be changed to $$S = \frac{3}{115}L = 0.026L$$

and the feed rate changed to $$Q_2 = \frac{7}{115}L = 0.061L$$

This last equation is plotted in FIG. 7 as graph B.

Reverting again to graph A of FIG. 7, the test results establish that the kiln capacity increase obtained by extending the reduction zone and increasing the rotational speed, is a straight line function within the range of 75′–115′ reduction zone length, and for kiln rotational speeds of 5.5–2.75. Although longer reduction zones and higher speeds were not tested, it appears logical to assume that the straight line function will be valid beyond the point of 115′ reduction zone length. This conclusion is based on the following facts. During the tests, there was no increase of tendency to sintering in the reduction zone when the zone was extended from 75′ to 115′. On the contrary, the sintering tendency appeared to be less in the 115′ zone. Based on heat transfer calculations from the test runs, it appears that surface temperatures of the kiln bed are lowered by the higher turbulence of the bed at faster rotational speed. Faster speeds also apparently permit higher temperatures of gases.

However, obviously there is a limit beyond which the function will not be a straight line. This limit is apparently reached when the kiln rotates so fast that the heat transferred to the bed surface has insufficient time to be absorbed in the endothermic reaction in the submerged period, that is, when the rate of reduction is slower than the heat transfer. In this case, the temperature of the bed will increase and if sufficiently high, sintering will occur. It has further been established from laboratory tests, that the reduction rate itself is very high when the heat transfer is good, and that accordingly the above-mentioned function will be valid also for higher rotational speeds.

Reverting to FIG. 7, it was established above that starting with the 7 t.p.h. feed rate obtained at a kiln slope of 3%, a kiln speed of 2.75 m.p.r. and a reduction zone length of 115′, as represented by point a of graph A, and that by reducing the length of the reduction zone to 75′, reducing the kiln slope to 1.95% and continuing to rotate the kiln at 2.75 m.p.r., the kiln capacity would be changed to 4.55 t.p.h., as represented by point b of graph B. Using these conditions as a base for further increasing the speed of kiln rotation and extending the reduction zone, the kiln capacity will be increased according to the new linear function represented by graph C of FIG. 7, which passes through point b of graph B, and through point c of graph A, at which the experimentally determined graph A, intersects the reduction zone length axis when the feed rate is reduced to zero. Graph C as thus obtained is represented by the following function as derived from the graph:

(4a) $\quad Q = Q_1 \dfrac{L-36}{L_1-36} = 4.55 \dfrac{L_2-36}{75-36} = 0.115L - 4.16$ where $Q_1$ and $L_1$ are the values at point $b$ of FIG. 7.

From graph C, FIG. 7, and the above Formula 4a derived therefrom, it will be seen that if the reduction zone is extended to 115', the capacity will be increased to 9.1 t.p.h. as shown by point $d$ of graph C, in order to obtain which, however, the kiln speed must be increased in inverse ratio of the old to the new feed rates as follows:

(4b) $\quad M_2 = Q_1/Q_2 M_1 = 4.55/9.1 \cdot 2.75 = 1.38$ m.p.r.

Furthermore, if only 75' is used as the reduction zone instead of 115', while maintaining the new kiln speed of 1.38 m.p.r., the kiln slope must be reduced in the ratio of these reduction zone lengths, i.e., from 1.95% to $$1.95 \cdot \dfrac{75'}{115'} = 1.27\%$$

The kiln capacity will then decrease in direct proportion to the kiln length from 9.1 to 5.9 t.p.h. according to the function (5) $\quad Q_3 = \dfrac{9.1}{115} \cdot L = 0.0785L$ This function is plotted as graph D in FIG. 7, in which the kiln capacity for the reduction zone of 75' is designated by point $e$.

The above study and analysis of the test data shows: (1) the importance of the principle of increasing the kiln capacity by extending the reduction zone and increasing the speed of rotation; (2) the considerable further increase in capacity obtainable by reducing the kiln slope and increasing the kiln speed; and (3) that for kilns with equal diameters the conventional scale-up in direct proportion to the length of the reduction zone is valid only when the slope of the longer kiln is made steeper in proportion to the increased capacity, and at the same time, the same kiln speed is maintained. (See function $Q = 0.061L$, graph B, in FIG. 7.)

For instance, using the 3.5 ton rate and 75' reduction zone, 3% slope and 5.5 m.p.r. as base for scaling-up to 115' reduction zone, the kiln must be set at a slope of $$\dfrac{3\% \times 115}{75} = 4.6\%$$

and rotated at 5.5 m.p.r. in order to give a capacity of 5.2 tons per hour corresponding to the conventional scale-up formula. On the other hand, if the kiln is scaled-up according to the above formula $Q = 0.089L - 3.23$, maintaining the 3% slope for the longer kiln and rotating at 2.75 m.p.r., the capacity for the 115' reduction zone will be 7 tons per hour. Then if the slope is reduced to 1.95% and the kiln is rotated at 1.38 m.p.r., the capacity for the 115' reduction zone is increased to 9 tons per hour. (See function $Q = 0.115L - 4.16$ in FIG. 7.)

Assuming now that the data for a base rate are known and the kiln is to be scaled-up according to the length to a rate Q, what will the formula for scale-up be? We will then have the following four cases:

*Case 1.*—When the kiln is scaled-up by maintaining the same rotation and changing the slope correspondingly, the conventional scale-up formula is valid.

The new feed rate will be:

(6) $\quad Q = q \cdot \dfrac{L}{l}$

The new slope will then be:

(7) $\quad S = s \cdot \dfrac{L}{l} = s \cdot \dfrac{Q}{q}$ wherein $q$, $s$ and $l$ are the initial feed rate, slope and reduction zone length, respectively, and Q, S and L are the corresponding scaled-up rates.

*Case 2.*—When the kiln is scaled-up by extending the reduction zone, maintaining the same slope and increasing the rotation correspondingly, from FIG. 7 the following formulae may be derived:

(8) $\quad Q = q \cdot \dfrac{L-36}{l-36}$

The new speed will then be:

(9) $\quad M = m \cdot \dfrac{l-36}{L-36}$ wherein M and $m$ are dimensioned as m.p.r.

*Case 3.*—When the kiln is scaled-up by extending the reduction zone, maintaining the slope and increasing the rotation correspondingly, then decreasing the kiln length and changing the slope—in effect, only increasing the rotation and changing the slope correspondingly, the following formulae are derived from FIG. 7:

The new feed rate will be:

(10) $\quad Q = q \cdot \dfrac{L-36}{l-36} \cdot \dfrac{l}{L}$

The new speed will be:

(11) $\quad M = \dfrac{L-36}{l-36} \cdot m$

The new slope will be:

(12) $\quad S = s \cdot \dfrac{q}{Q} = s \cdot \dfrac{l}{L}$

*Case 4.*—When the kiln is scaled-up by extending the reduction zone, maintaining the same slope, and increasing the rotation correspondingly—then, subsequently changing the slope and increasing the rotation correspondingly, the following relationships exist:

(13) $\quad \dfrac{Q}{q} = \dfrac{L-36}{l-36}$

(14) $\quad Q = q \dfrac{L-36}{l-36}$ where, for example, Q, L and $q$, $l$, are the values for feed rate and reduction zone length at points $a$ and $e$, respectively, of graph A, FIG. 7.

(15) $\quad \dfrac{Q}{q_2} = \dfrac{L}{l}$ where $q_2$ is, for example, the feed rate at point $b$, graph B, of FIG. 7.

(16) $\quad \dfrac{Q_2}{q_2} = \dfrac{L-36}{l-36}$ where $Q_2$, for example, is the feed rate at point $d$, graph C, of FIG. 7.

Eliminating $q_2$ from (15) and (16) and substituting $Q_2$ for Q in (14) we obtain:

(17) $\quad Q_2 = q \cdot \left[\dfrac{L-36}{l-36}\right]^2 \cdot \dfrac{l}{L}$

The new feed rate will then be:

(18) $\quad Q_2 = q \cdot \left[\dfrac{L-36}{l-36}\right]^2 \cdot \dfrac{l}{L}$

The new slope will then be:

(19) $\quad S = s \cdot \dfrac{q_2}{Q} = s \cdot \dfrac{l}{L}$

The new rotation will be:

(20) $\quad M = m \cdot \left[\dfrac{l-36}{L-36}\right]^2$

Figure 8:
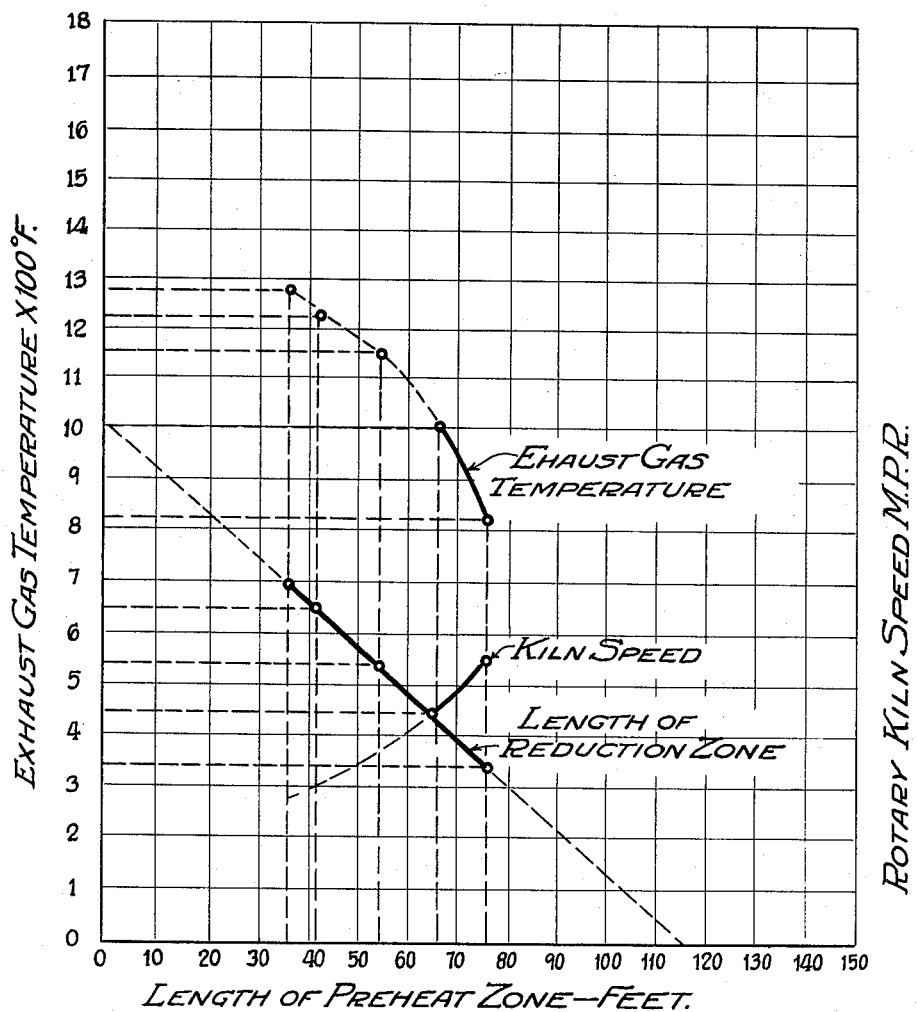
FIGURE 8 is a graphical plot of the exhaust gas temperatures, rotary kiln speed and length of reduction zone versus length of preheating zone for the ore reductions with reference to FIGS. 2–6, inc.

In the above analysis the effect of lengthening the reduction zone was presented. In order to obtain a complete picture of the total effect on the kiln, the preheating zone and the exhaust gas temperature must also be taken into account. From FIGS. 2–6, inc., and Table I, it will be seen that in the tests the preheating zones in the tests were shortened progressively as the reduction zones were lengthened. At the same time the exhaust gas temperature increased, although not at the rate that might be expected. The relatively low increase is due to increased heat transfer in the preheating zones because of increased rotation. These data of Table I are presented graphically in FIG. 8.

Figure 6:
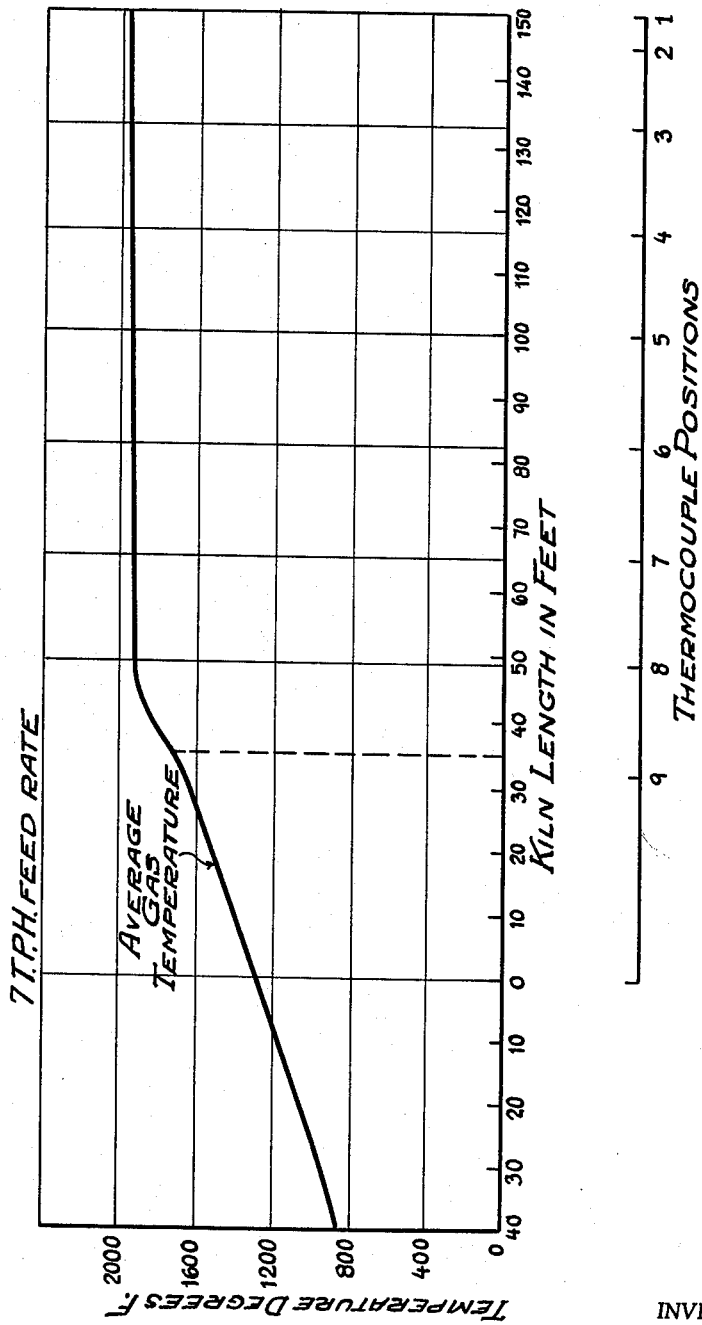

From FIG. 2 (3.5 ton rate) it will be seen that it takes 35′ of the kiln length to cool the kiln gases from about 1750° F. to about 1280° F. FIG. 6 (7 ton rate) shows that also in this case 35′ kiln length was required to cool the gases from about 1750° F. to 1280° F. This shows that, in this zone, it takes practically the same length of kiln to preheat twice the amount of ore, providing the speed is increased correspondingly. The same exhaust gas temperature will then be practically the same.

FIG. 2 shows that 40′ of the kiln was required to cool the gases from about 1280° F. to 820° F. Assuming the same relationship in this zone as regards heat transfer, it is necessary to extend the kiln in FIG. 6 (7 ton rate), 40′ in order to obtain the same exhaust gas temperature as in FIG. 2 (3 ton rate). In other words, the total length of the preheating zone for the 3.5 ton rate is 75′ for an exhaust gas temperature of 820° F. This length seems to be practically constant for higher rates and correspondingly higher speeds. FIG. 6 shows the gas temperature profile for the kiln when the preheating zone is extended 40′.

Reverting to Table I, it will be noted that the exhaust gas temperatures rose steadily with increased feed rate and shorter preheating zones. However, in spite of this, as further shown in Table I, the gas consumption per ton of feed ore remained practically constant. Evidently, the reason is that the increased heat carried out with the hotter gases was compensated by correspondingly lower kiln radiation loss per ton of ore.

Further tests have established that the radiation losses for the 3.5 ton rate was 11.47% of the total heat per ton or ore, and for the 6.5 ton rate was 5.53% of the total heat per ton of ore. The sensible heat in dry exhaust gases was 12.12% of the total heat per ton of ore for the 3.5 ton rate and 17.81% for the 6.5 ton rate. The difference in both cases is practically 5%. Thus, the increased heat carried out with the exhaust gases is compensated by lesser heat losses per ton of ore from the kiln itself.

It is also interesting to note that the difference between exhausting the gases at 820° F. or at 1220° F. represents approximately 5% of the total fuel. On the other hand, it takes a 40′ longer kiln to cool the gases from 1220° F. to 820° F. The question whether to use a 40′ longer kiln or to use 5% more fuel is of course a matter to be determined in any particular case in accordance with the comparative costs involved.

Having thus established the relationships between kiln speed, feed rate, kiln slope and/or reduction zone length, for the optimum processing of loose aggregates of reactive materials, attention will now be directed to the effect of kiln loading. As above pointed out I have discovered on this aspect, that for any given kiln speed, the higher the kiln loading within permissible limits, the higher is the rate of reaction in the material processed, with resultant corresponding further increase of kiln capacity. The test data on which this is based will now be presented.

Referring to FIGS. 9a and 9b, in order to investigate the temperature conditions occurring within the kiln wall during the ore reduction runs above described with reference to FIGS. 2–5, inc., thermocouples were inserted in the kiln lining in the manner illustrated at A, B and C, and such that they were buried to depths of ¼, ½ and 1 inch, respectively, from the inner surface 40 of the kiln wall 41. Referring to FIG. 9c, temperature measurements were taken on these thermocouples during kiln rotation, at the angular positions designated by the numerals 1–16, inc., with the results as tabulated in the following Table II, in which temperature readings were taken at each of positions 1–16, inc., both at 5 p.m. and at 2 a.m. during a 24-hour run, while rotating the kiln under "steady state" conditions.

TABLE II

*Inner kiln wall temperature data*

Conditions:
 (1) Coke and ore discharging from kiln.
 (2) #3 thermocouple temperature, 1984 degrees F.
 (3) Kiln speed, 4/40 m.p.r.

| Quad. | Thermo-position | Degrees F. Thermo., 5:00 p.m. | | | Degrees F. Thermo., 2:00 a.m. | | |
|---|---|---|---|---|---|---|---|
| | | "A" | "B" | "C" | "A" | "B" | "C" |
| Q-1 | 1 | 1,827 | 1,750 | 1,676 | 1,832 | 1,750 | 1,659 |
| | 2 | 1,827 | 1,750 | 1,669 | 1,832 | 1,750 | 1,664 |
| | 3 | 1,827 | 1,755 | 1,669 | 1,832 | 1,745 | 1,664 |
| | 4 | 1,827 | 1,755 | 1,669 | 1,832 | 1,745 | 1,664 |
| Q-2 | 5 | 1,827 | 1,755 | 1,669 | 1,832 | 1,745 | 1,664 |
| | 6 | 1,827 | 1,755 | 1,669 | 1,832 | 1,750 | 1,664 |
| | 7 | 1,822 | 1,755 | 1,669 | 1,832 | 1,750 | 1,664 |
| | 8 | 1,822 | 1,755 | 1,669 | 1,832 | 1,750 | 1,659 |
| Q-3 | 9 | 1,817 | 1,755 | 1,669 | 1,832 | 1,750 | 1,659 |
| | 10 | 1,817 | 1,755 | 1,669 | 1,832 | 1,750 | 1,659 |
| | 11 | 1,817 | 1,755 | 1,669 | 1,832 | 1,750 | 1,659 |
| | 12 | 1,822 | 1,755 | 1,669 | 1,832 | 1,750 | 1,659 |
| Q-4 | 13 | 1,822 | 1,755 | 1,669 | 1,832 | 1,750 | 1,664 |
| | 14 | 1,822 | 1,755 | 1,669 | 1,832 | 1,750 | 1,664 |
| | 15 | 1,827 | 1,755 | 1,669 | 1,832 | 1,750 | 1,664 |
| | 16 | 1,827 | 1,750 | 1,669 | 1,832 | 1,750 | 1,664 |

It will be noted from the foregoing data, that the temperature readings for thermocouple C, spaced 1 inch from the inner kiln surface, were constant during rotation of the kiln, as were also the temperatures measured on thermocouple B, disposed ½ inch inside the kiln lining. It is further to be noted that the temperatures of thermocouple A located only ¼ inch inside the kiln lining was likewise practically constant. These tests, therefore, establish that any heat absorbed by the kiln lining, while the latter is passing through the gas phase, and given off to the kiln bed while covered thereby, must be absorbed in a very thin surface layer of the lining which is less than about ¼ inch thick. The amount of heat thus transferred is practically insignificant in relation to the heat requirements of the kiln load.

Referring now to FIG. 10, temperatures inside the kiln were measured during rotation by the three thermocouples D, E and F of different lengths, such that they extended, respectively, for radial distances of 8, 16 and 24 inches into the kiln interior, the inside radius of the kiln being 45 inches. Temperature measurements were taken with the thermocouples in the positions D–1, E–1 and F–1, as the thermocouples emerged from the kiln bed K; and also in positions D–2, E–2 and F–2, as the thermocouples were about to be immersed in the kiln bed. The temperature readings thus obtained are recorded on the drawing. As shown by the data, the temperature measured by thermocouple D rises from 1980° F., as it emerges from the kiln bed K, to 2020° F. as it passes through the gas phase and again immerses into the kiln bed, the temperature difference being 40°. For thermocouple E, the measured temperature rises from 1990° F. to 2045° F., with a difference of 55° F.; while that for thermocouple F it rises from 2005° F. to 2075° F., with a difference of 70° F.

In FIG. 11 the temperature data of FIG. 10 is plotted against the distance from the center of the kiln, and graphs G and H drawn, respectively, through the low temperature readings D–1, E–1, F–1 and the high temperature readings D–2, F–2, E–2. By extrapolation of these graphs, it will be noted that the temperature difference between equidistant points on the surface of the kiln bed, increases from 30° F. at the kiln wall to 108° F. at the center of the kiln. In other words, a particle of the material processed which is disposed adjacent the kiln wall, will be at 30° F. higher temperature when it immerses into the bed than when it emerges from the bed; and a particle disposed in the bed surface close to the center of the kiln will have a corresponding difference of 108° F. The heat thus transferred to the bed due to this temperature differential is consumed in the bed for the endothermic reaction and to compensate for heat losses.

The amount of heat transferred in this way to the material being processed, can be calculated from the amount of heat thus transferred to the bed during one rotation of the kiln multiplied by the number of kiln rotations during the retention time of the material in the reduction zone. This calculation may be made as follows. From the graphs of FIG. 11, it is found that the mean temperature difference for the particles of material processed, as between immersing and emerging from the kiln load equals 52° F. or 29° C. On a particular ore reduction run made, the specific heat of the kiln load was found to be 0.2. The kiln load was about 35%, the kiln rotation employed was 6 m.p.r., and the retention time in the reduction zone was found to be 6 hours, so that the material remained in the reduction zone for a total of 60 revolutions. With the above kiln load of 35% the number of turnovers of the kiln load per revolution was three; hence the total number of turnovers during the retention time was thus 180. From this, the total heat absorbed in the bed per ton of feed ore was thus found to be 1000 kg.$\times 0.2 \times 29 \times 180 = 1{,}050{,}000$ calories or 4.2 million B.t.u.'s. For comparison, the theoretical heat requirements for reducing the iron oxides of the ore processed down to the metal was found to be 4.2 million B.t.u.'s. This establishes that the heat as transferred to the bed was practically equal to the theoretical heat requirements for the ore reduction. The heat transfer in the kiln consequently takes place by direct heat transfer from the gaseous kiln atmosphere to the bed surface. As shown above, the heat transferred to the kiln wall, is exceedingly small and just sufficient to compensate for the heat loss through the kiln wall.

The above test data further shows that the heat transfer near the center of the bed is several times larger than that adjacent the kiln wall. Hence the material immersing and emerging near the center of the kiln load is being reduced several times faster than the material in the outer portions of the kiln load. Accordingly, as the kiln load is increased at any given kiln speed, the speed of reaction of the material will be correspondingly increased, since the bed surface progressively approaches closer and closer to the center of the kiln where the temperature of the furnace gases is highest.

Most rotary kilns are operated with a relatively low kiln load or bed depth, usually on the order of 8–12% of the total internal volume of the kiln. As shown above, such operation is highly inefficient with respect both to speed of reaction and effective utilization of available kiln capacity at any given speed of kiln rotation. In order to demonstrate this, consider the comparison between operating the kiln at a 35% load, for example, versus that for a load only one-third as large.

The bed depth for the 35% load will be approximately 0.4D or 0.8R where D and R are, respectively, the inner diameter and radius of the kiln. For the kiln load of only one-third the above, that is, 11.7%, the bed depth will be 0.21D or 0.42R. The cord for the bed load of 35% will be 1.95R and that for the 11.7% load will be 1.628R. The heat surface of the 35% load will then be:

$$\frac{1.95}{1.628} =$$

1.20 times the heat surface of the smaller or 11.1% load

If the kiln is rotated at the same speed at each load, the higher load will turn three times as much material over a 20% larger heat surface than the smaller load. Assuming that the heat surface is the same in both cases, the effect of turning over three times as much material is known from the rotational effect as above established herein. In this case, it would be equal to turning the kiln with the smaller kiln load three times faster. This effect can be calculated on the basis of the formulas above developed with reference to FIG. 7. That is to say, if the speed is increased three times, the capacity is increased by the same factor. Assuming the reduction zone for the smaller load to be 75 feet, it will thus be extended to 160 feet for the larger and at increased speed in accordance with the formulas for "Case 2," supra. Reducing the length of the reduction zone to 75 feet, maintaining the same speed and changing the slope, the capacity will be:

$$\frac{3 \times 3.5 \times 75}{160} = 4.98 \text{ tons}$$

The relative increase will be:

$$\frac{4.9}{3.5} = 1.40 \text{ or } 40\%$$

Summing up both effects, we have: (1) The effect of enlarged heat surface=20%. (2) The effect of increased turnover of material over the heat surface=40%. Total heat transfer increase=20%+40%=60%. In other words, by operating a kiln with 35% kiln load instead of 11.7% kiln load, the heat transfer and the capacity are increased by 60%.

Consideration will now be given to the effect of kiln diameter on the methods of operation and formulae above discussed. As above stated, the test results presented in Table I and FIGS. 2–6, inc., were obtained in a pilot kiln of 7.5' inside diameter and 150' in length. For comparison in the present discussion a kiln is chosen with twice as large diameter and with the same length, namely, 15' I.D. x 150' length. The dimensions of the reduction zone in each of these kilns are assumed to be the same, namely, 75', the comparative dimensions would be:

Pilot kiln=7.5' I.D.=75' L
Large kiln=15' I.D.=75' L

The heat surface of the pilot kiln is only one-half of the heat surface of the larger kiln. If the pilot kiln reduction zone is extended to twice its length, that is, to 150', it would have the following dimensions, namely, 7.5' I.D. x 150' L. The pilot kiln has a capacity of 3.5 t.p.h. at 3% slope, 5.5 m.p.r. and 75' length of the reduction zone. By extending the reduction zone to 150', maintaining the slope and speeding up the kiln rotation to 1.88 m.p.r., the capacity of the extended pilot kiln, as derived from the graphs of FIG. 7, in the manner above explained will be:

(21) $\quad Q = q \cdot \dfrac{L-36}{L-36} = 3.5 \cdot \dfrac{150-36}{75-36} = 10.2$ t.p.h.

This extended pilot kiln will have the same heat surface as the large diameter kiln at 75' L (15' I.D. x 75' L). However, the latter will contain twice as much material as the extended pilot kiln, which means that if both kilns are rotated at the same rotational speed (1.88 m.p.r.), twice as much material will be passed over the same surface in the larger diameter kiln. In other words, the heat transfer in the large kiln (15' I.D. x 75' L) will be practically the same as the heat transfer in the extended pilot kiln (7.5' I.D. x 150' L) when the latter is rotated twice as fast as the large kiln. The extended pilot kiln has a capacity of 10.2 t.p.h. at 3% slope and 1.88 m.p.r. By rotating this kiln 0.94 m.p.r. and changing the slope correspondingly, the capacity will increase 30% from 10.2 t.p.h. to 13.26 t.p.h. This will then be the capacity of the large diameter kiln.

Comparing now the capacities of the small kiln (7.5' I.D. x 75' L) and the large diameter kiln (15' I. D. x 75' L) gives:

Large kiln=13.26 t.p.h. at 1.88 m.p.r.
Small kiln=5.1 t.p.h. at 1.88 m.p.r.

For the same speed of kiln rotation, this relationship exists:

$$(22) \quad \frac{Q}{q} = \frac{13.26}{5.1} = 2.6$$

Converting this to the relationship of the kiln diameters gives:

$$(23) \quad \frac{Q}{q} = \frac{D^{1.4}}{d^{1.4}} = \frac{15^{1.4}}{7.5^{1.4}} = 2.6$$

It is interesting to note that this function for the diameter-capacity relationship, is the same as the function arrived at by heat calculation formulae. It should, however, also be noted that this function is only valid when both kilns are rotated at the same rotational speed. Another important consideration is that the slope of the large kiln will have to be adjusted correspondingly for compensating the faster travel rate of the kiln load in a larger diameter kiln.

As pointed out above, the formula $$Q/q = \frac{D^{1.4}}{d^{1.4}}$$

is only valid when both kilns have the same rotational speed. If the speed is changed, the formula must be corrected for the change in speed to:

$$(24) \quad \frac{Q}{q} = \frac{D^{1.4}}{d^{1.4}} \cdot C$$

Considering the effect of the diameter and length, the general, summarized formula for scale-up will then be:

*Case 1.*—Maintaining slope and increasing kiln speed.

$$(25) \quad Q = q \cdot \frac{D^{1.4}}{d^{1.4}} \cdot C \frac{L-36}{l-36}$$

*Case 2.*—Changing slope and increasing kiln speed:

$$(26) \quad Q = q \cdot \frac{D^{1.4}}{d^{1.4}} \cdot C \cdot \left[\frac{L-36}{l-36}\right]^2 \cdot \frac{l}{L}$$

What is claimed is:

1. The method of processing loose aggregates of reactive materials, at high feed rates, in an axially inclined rotary kiln having an upper charging inlet and a lower discharging outlet, which comprises: establishing said kiln inclination at a slope of not more than about 2 degrees to the horizontal, progressively feeding into the charging end said loose aggregate material while rotating said kiln at a rate of at least one-half revolution per minute, said charging rate being such as to establish and maintain a moving bed of said material occupying about 15–25% of the kiln volume, and while injecting into the kiln discharge end a mixture of hot combustible gases and a controlled amount of free oxygen-containing gas such as to establish and maintain thereat a temperature effecting reaction of said material, and so adjusting the rotary kiln speed in relation to the kiln slope as to completely react each portion of said material as it passes through said reaction zone.

2. The method for effecting rapid, solid state reduction of oxidic ores and the like in an inclined rotary kiln having upper charging and the lower discharging ends and penetrated by gas inlet tubes spaced therealong, which comprises: establishing the slope of said kiln at not more than about two degrees, rotating said kiln at speed of at least one-half revolution per minute while progressively feeding into said charging end a loose aggregate of said ore and a solid carbonaceous reductant at a rate to maintain a moving bed thereof occupying about 15–25% of the kiln volume and while traversing said kiln with a counterflow of hot combustible gases, adjusting the temperature at said charging end to temperature to reduce said ore to the metallic state without fusion and progressively extending the reduction zone thus established toward said charging end by controlled introduction of free oxygen-containing gas through said tubes until maximum metallization of said ore without fusion is attained.

3. In a process for reducing oxidic iron ore and the like in a rotary kiln inclined at a slope not exceeding about two percent and penetrated by gas inlet tubes spaced therealong, the method of inducing optimum metallization of said ore at a high ore feed rate, which comprises: progressively feeding said ore and a solid carbonaceous reductant into said kiln at a relatively low initial rate in the presence of a counterflow of hot combustible gases and while rotating said kiln at a speed to establish a moving bed of said material occupying about 15–25% of said kiln volume, adjusting the temperature at the kiln discharge end by introducing free oxygen containing gas thereat, until substantially the maximum temperature for reducing said ore without sintering is obtained and extending said temperature thence toward the free end of said kiln by controlled introduction of free oxygen-containing gas through said tubes and over a length such as to provide optimum metallization of said ore at said feed rate, thereafter increasing the feed rate and increasing the kiln speed to at least one-half revolution per minute while further extending said reduction zone until substantially maximum metallization of said ore at said increased kiln speed is obtained.

4. In a process for reducing oxidic ores and the like wherein said ore admixed with a solid carbonaceous reductant is progressively reduced in an inclined rotary kiln having gas inlet tubes spaced therealong, the method of altering the feed rate of said ore-reductant mixture from a first to a second preselected value while effecting maximum metallization of said ore, which comprises: feeding said ore-reductant mixture into said kiln at said first preselected rate $Q_1$ while rotating said kiln at a speed $M_1$ adjusted to establish a moving bed of said ore-reductant mixture occupying about 25–45% of the volume of said kiln, and while traversing said kiln with a counterflow of hot combustible gases, adjusting the temperature at the discharge end of said kiln by controlled introduction of free oxygen containing gas and to substantially the maximum temperature for reducing said ore to the metallic state without sintering, extending said reduction temperature toward the feed end of said kiln by selective control of additional free oxygen-containing gas introduced through said tubes to provide a reduction zone of length $L_1$ effecting substantially maximum metallization of said ore at said feed rate, thereupon altering the feed rate to said second preselected value $Q_2$ while altering the rotary speed of said kiln to a value $M_2$ substantially equal to $M_1 \cdot Q_1/Q_2$ to maintain the volume of said moving bed at about 25–45% of the volume of said kiln, and readjusting said reduction zone in said manner to a length $L_2$ substantially in accordance with the formula $$L_2 = Q_2/Q_1(L_1-36)+36$$

5. The method of reducing oxidic ores and the like to a high degree of metallization and at a relatively high feed rate in an inclined rotary kiln having gas inlet tubes spaced therealong, which comprises: feeding said ore and a solid carbonaceous reductant into the feed end of said kiln in the presence of a counterflow of hot combustible gases therein, and at an initially low rate $Q_1$ while rotating said kiln at a speed $M_1$ adjusted to establish a moving bed of said ore-reductant mixture occupying about 25–45% of the volume of said kiln, adjusting the temperature at the discharge end of said kiln to a value just sufficiently high to reduce said ore without sintering, and extending said reduction temperature toward the feed end of said kiln by selective control of free oxygen-containing gas introduced through said tubes to provide a reduction zone of length $L_1$ effecting substantially maximum metallization of said ore at said feed rate, thereupon increasing said feed rate to a higher value $Q_2$ and increasing the rotary speed of said kiln to a value $M_2$ substantially equal to $M_1 Q_1/Q_2$ to maintain the volume of said moving bed substantially constant, and further extending said reduction zone in the manner above stated to a length $L_2$ substantially in accordance with the formula $$L_2 = Q_2/Q_1(L_1-36)+36$$

6. In a process for reducing oxidic ores and the like in an inclined rotary kiln of adjustable slope and rotary kiln speed and penetrated by gas inlet tubes spaced therealong, the method of adjusting said kiln for a high feed rate of said ore at optimum metallization thereof and thereafter so operating said kiln, which comprises: initially adjusting said kiln to a relatively high slope $S_1$ and progressively feeding said ore together with a solid carbonaceous reductant into said kiln at a relatively low initial feed rate $Q_1$ while rotating said kiln at a speed $M_1$ adjusted to establish a moving bed of said ore-reductant material occupying about 15-25% of the kiln volume, and while traversing said kiln with a counterflow of hot combustible gases, adjusting the temperature at the kiln discharge end to a value just sufficiently high to reduce said ore to the metallic state without fusion, extending the reduction temperature toward the kiln feed end by selective introduction of oxygen-containing gas through said tubes until a reduction zone of length $L_1$ effecting substantially maximum metallization of said ore at said feed rate is obtained, progressively further increasing said feed rate while proportionately increasing the kiln rotary speed to maintain said bed volume substantially constant and while further extending said reduction zone by selective introduction of oxygen-containing gas through said tubes until a reduction zone $L_2$ of greater length effecting substantially maximum metallization of said ore is obtained, thereupon decreasing the slope of said kiln substantially to a value $S_2 = S_1 \cdot L_1/L_2$ while increasing the feed rate substantially to the value $$Q^2 = Q_1 \cdot L_1/L_2 \left(\frac{L_2-36}{L_1-36}\right)^2$$

and increasing the rotary kiln speed substantially to the value $M_2 = Q_2/Q_1 \cdot M_1$, said slope being so adjusted that the rotary kiln speed $M_2$ is no slower than about two minutes per revolution.

7. The method of reducing oxidic ores and the like to a high degree of metallization in an inclined rotary kiln having upper and lower, feed and discharge ends, respectively, and having gas inlet tubes spaced therealong, which comprises: progressively feeding said ore and a solid carbonaceous reductant into the feed end of said kiln at a preselected feed rate Q in tons per hour, and while inducing a counterflow of hot combustible gases in said kiln and rotating the same at a rate to establish and maintain a moving bed of said ore-reductant mixture occupying about 25-45% of the volume of said kiln, adjusting the temperature of said hot gases at the discharge end of said kiln just sufficiently high to reduce said ore to the metallic state without fusion or sintering and extending said temperature of reduction from said discharge end toward the delivery end of said kiln by selective control of air introduced through said tubes to provide a reduction zone of length L in feet, which is related to said feed rate Q, to the diameter D in feet and to the slope S in percent of said kiln, substantially in accordance with the following formula:

$$Q = \frac{0.03}{S}\left(\frac{D}{150}\right)^{1.4}[0.089L-3.23]$$

References Cited in the file of this patent

UNITED STATES PATENTS

| 2,397,993 | Urquhart | Apr. 9, 1946 |
| 2,829,042 | Moklebust | Apr. 1, 1958 |

FOREIGN PATENTS

| 882,324 | Great Britain | Nov. 15, 1961 |
| 574,124 | Canada | Apr. 14, 1959 |